(12) United States Patent
Xiu et al.

(10) Patent No.: US 12,238,337 B2
(45) Date of Patent: Feb. 25, 2025

(54) METHODS AND SYSTEM OF SUBBLOCK TRANSFORM FOR VIDEO CODING

(71) Applicant: BEIJING DAJIA INTERNET INFORMATION TECHNOLOGY CO., LTD., Beijing (CN)

(72) Inventors: Xiaoyu Xiu, Beijing (CN); Yi-Wen Chen, Beijing (CN); Xianglin Wang, Beijing (CN); Shuiming Ye, Beijing (CN); Tsung-Chuan Ma, Beijing (CN); Hong-Jheng Jhu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 150 days.

(21) Appl. No.: 17/549,631

(22) Filed: Dec. 13, 2021

(65) Prior Publication Data
US 2022/0109886 A1  Apr. 7, 2022

Related U.S. Application Data

(63) Continuation of application No. PCT/US2020/037445, filed on Jun. 12, 2020.
(Continued)

(51) Int. Cl.
*H04N 19/70* (2014.01)
*H04N 19/18* (2014.01)
(Continued)

(52) U.S. Cl.
CPC ............ *H04N 19/70* (2014.11); *H04N 19/18* (2014.11); *H04N 19/186* (2014.11); *H04N 19/625* (2014.11); *H04N 19/96* (2014.11)

(58) Field of Classification Search
CPC .... H04N 19/119; H04N 19/12; H04N 19/159; H04N 19/176; H04N 19/18;
(Continued)

(56) References Cited

U.S. PATENT DOCUMENTS

| 10,313,688 B2 | 6/2019 | Terada et al. |
| 2012/0189052 A1 | 7/2012 | Karczewicz et al. |

(Continued)

FOREIGN PATENT DOCUMENTS

| CN | 103329529 A | 9/2013 |
| CN | 103716621 A | 4/2014 |
| CN | 117478913 A | 1/2024 |

OTHER PUBLICATIONS

Bross et al: "Versatile Video Coding (Draft 5}",—14. JVET Meeting; Mar. 19, 2019-Mar. 27, 2019; Geneva; (The Joint Video Exploration Team of ISO/IEC JTC1/SC29/;WG11 and ITU-T SG. 16},, No. JVET-N1001-v8; JVET-N1001 Jun. 11, 2019 (Jun. 11, 2019).*

(Continued)

*Primary Examiner* — Mohammed S Rahaman
(74) *Attorney, Agent, or Firm* — Myers Bigel, P.A.

(57) ABSTRACT

A computing device performs a method of decoding video data by receiving, from a bitstream, a first syntax element associated with an SBT coding unit that indicates that there exists at least one non-zero transform coefficient in the SBT coding unit; determining a first transform unit that includes non-zero transform coefficients; receiving a second syntax element associated with a first chroma component of the first transform unit, a third syntax element associated with a second chroma component, and a fourth syntax element associated with luma component of the first transform unit; decoding the transform coefficients of chroma and luma components of the first transform unit, based on the second, third and fourth syntax elements; and setting transform
(Continued)

coefficients of luma and chroma components of rest of the plurality of transform units to zeros.

18 Claims, 11 Drawing Sheets

Related U.S. Application Data

(60) Provisional application No. 62/861,230, filed on Jun. 13, 2019.

(51) Int. Cl.
*H04N 19/186* (2014.01)
*H04N 19/625* (2014.01)
*H04N 19/96* (2014.01)

(58) Field of Classification Search
CPC .... H04N 19/186; H04N 19/61; H04N 19/625; H04N 19/70; H04N 19/96
See application file for complete search history.

(56) References Cited

U.S. PATENT DOCUMENTS

| | | | |
|---|---|---|---|
| 2012/0308148 A1* | 12/2012 | Kim | H04N 19/44 |
| | | | 382/233 |
| 2013/0034152 A1* | 2/2013 | Song | H04N 19/52 |
| | | | 375/240.18 |
| 2014/0078249 A1 | 3/2014 | Wang | |
| 2014/0092966 A1 | 4/2014 | Kazui et al. | |
| 2016/0156917 A1 | 6/2016 | Ugur et al. | |
| 2016/0219276 A1* | 7/2016 | Li | H04N 19/119 |
| 2018/0288437 A1* | 10/2018 | Hsiang | H04N 19/60 |
| 2019/0149822 A1 | 5/2019 | Kim et al. | |
| 2022/0094939 A1* | 3/2022 | Chuang | H04N 19/91 |

OTHER PUBLICATIONS

Zhao et al. "CEG: ROT-like sub-block transform for inter blocks (Test 6.4.4)", 13. JVET Meeting; Jan. 9, 2019-Jan. 18, 2019: Marrakech: (The Joint Video Exploration Team of ISO/IEC JTC1/SC29/WG11 and ITU-T SG. 16 },, No. JVET-MO0141 Jan. 11, 2019.*

Beijing Dajia Internet Information Technology Co., Ltd., CN202210245849.X, First Office Action, Jan. 11, 2023, 23 pgs.

Bross et al., "Versatile Video Coding (Draft 5)", Document: JVET-N1001-v7v8, Joint Video Experts Team (JVET), of ITU-T SG 16 WP 3 and ISO/IEC JTC 1/SC 29/WG 11, 14th Meeting: Geneva, CH, Mar. 19-27, 2019, 400 pgs.

Liang et al., "The Real-time Arithmetic and Realization of Encoding and Decoding of DGPS's RTCM Data", Global Position System (GPS), Differential GPS(DGPS), RTCM, MSCOMM, Visual C++, TP311; TP391, 1002-8331-(2006) 11-0209-03, Chinese Academy of Agricultural Mechanization of Sciences, Beijing 100083, 3 pgs.

Huawei Technologies Co., Ltd., "CE6: RQT-like sub-block transform for inter blocks (Test 6.4.4)", Document: JVET-M0141-v21, Joint Video Experts Team (JVET) of ITU-T SG 16 WP 3 and ISO/IEC JTC 1/SC 29/WG 11, 13th Meeting: Marrakech, MA, Jan. 9-18, 2019, 5 pgs.

Beijing Dajia Internet Information Technology Co. Ltd. et al., International Search Report and Written Opinion, PCT/US2020/037445, Sep. 22, 2020, 8 pgs.

Benjamin Bross et al., "Versatile Video Coding (Draft 5)," JVET-N1001-v8, Joint Video Experts Team (JVET) of ITU-T SG 16 WP 3 and ISO/IEC JTC 1S/C 29/WG 11 14th Meeting: Geneva, CH, Jun. 11, 2019, pp. 1-385, pp. 53-62, 114, 118.

Yin Zhao et al., "CE6: RQT-like sub-block transform for inter blocks (Test 6.4.4)," JVET-M0141-v1, Joint Video Experts Team (JVET) of ITU-T SG 16 WP 3 and ISO/IEC JTC 1/SC 29 WG 11, 13th Meeting: Marrakech, MA, Jan. 11, 2019, pp. 1-5, pp. 1-2.

Extended Search Report for EP 20823103.5 mailed May 22, 2023, 14 pages.

Bross, Benjamin , et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, 423 pages.

Chen, Jianle , et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11, 14th Meeting: Geneva, CH, Mar. 19-27, 2019, 76 pages.

Chernyak, Roman , et al., "CBF flags signalling in VVC", Joint Video Experts Team (JVET) of ITU-T SG 16 WP 3 and ISO/IEC JTC 1/SC 29/WG 11, 14th Meeting: Geneva, CH, Mar. 19-27, 2019, 7 pages.

Jung, Jason , et al., "Non-CE6: Modifications on sub-block transform", Joint Video Experts Team (JVET) of ITU-T SG 16 WP 3 and ISO/IEC JTC 1/SC 29/WG 11, 14th Meeting: Geneva, CH, Mar. 19-27, 2019, 3 pages.

Zhao, Yin , et al., "CE6: RQT-like sub-block transform for inter blocks (Test 6.4.4)", Joint Video Experts Team (JVET) of ITU-T SG 16 WP 3 and ISO/IEC JTC 1/SC 29/WG 11, 13th Meeting: Marrakech, MA, Jan. 9-18, 2019, 4 pages.

Zhao, Yin , et al., "CE6: Sub-block transform for inter blocks (CE6.4.1)", Joint Video Experts Team (JVET) of ITU-T SG 16 WP 3 and ISO/IEC JTC 1/SC 29/WG 11, 13th Meeting: Marrakech, MA, Jan. 9-18, 2019, 18 pages.

Chinese Office Action corresponding to Chinese Patent Application No. 202311490927.3, (Foreign Text, 3 Pages, English Translation Thereof, 3 Pages) (Oct. 12, 2024),.

Notice of Allowance corresponding to Chinese Patent Application No. 202311490927.3, (Foreign Text, 2 Pages, English Translation Thereof, 2 Pages) (Jan. 7, 2025),.

\* cited by examiner

600

```
receiving, from a bitstream, a first syntax element associated with the
SBT coding unit, wherein the first syntax element indicates that there
exists at least one non-zero transform coefficient in the SBT coding unit
610
```
↓
```
in response to receiving the first syntax element indicating that there
exists at least one non-zero transform coefficient in the SBT coding unit,
determining a first transform unit of the plurality of transform units that
includes non-zero transform coefficients 620
```
↓
```
receiving, from the bitstream, a second syntax element associated with a
first chroma component of the first transform unit to indicate whether all
transform coefficients of the first chroma component are zeros, and a
third syntax element associated with a second chroma component of the
first transform unit to indicate whether all transform coefficients of the
second chroma component are zeros 630
```
↓
```
receiving, from the bitstream, a fourth syntax element associated with
luma component of the first transform unit to indicate whether all
transform coefficients of the luma component are zeros 640
```
↓
```
decoding the transform coefficients of chroma and luma components of
the first transform unit, based on the second, third and fourth syntax
elements, from the bitstream 650
```
↓
```
setting transform coefficients of luma and chroma components of rest of
the plurality of transform units to zeros 660
```

FIG. 6

METHODS AND SYSTEM OF SUBBLOCK TRANSFORM FOR VIDEO CODING

CROSS-REFERENCE TO RELATED APPLICATIONS

This application is a continuation of International Application No. PCT/US2020/037445, entitled "METHODS AND SYSTEM OF SUBBLOCK TRANSFORM FOR VIDEO CODING" filed on Jun. 12, 2020, which is based upon and claims priority to U.S. Provisional Application No. 62/861,230, entitled "METHODS AND APPARATUS ON SUBBLOCK TRANSFORM FOR VIDEO CODING" filed on 13 Jun. 2019, the entire content thereof is incorporated herein by reference for all purposes.

TECHNICAL FIELD

The present application generally relates to video data encoding and decoding, and in particular, to method and system of subblock transform (SBT) mode for video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

SUMMARY

The present application describes implementations related to video data encoding and decoding and, more particularly, to improved system and method of subblock transform in video coding.

According to a first aspect of the present application, a method of decoding a sub-block transform (SBT) coding unit, wherein the SBT coding unit is partitioned into a plurality of transform units, the method comprising: receiving, from a bitstream, a first syntax element associated with the SBT coding unit, wherein the first syntax element indicates that there exists at least one non-zero transform coefficient in the SBT coding unit; in response to receiving the first syntax element indicating that there exists at least one non-zero transform coefficient in the SBT coding unit, determining a first transform unit of the plurality of transform units that includes non-zero transform coefficients; receiving, from the bitstream, a second syntax element associated with a first chroma component of the first transform unit to indicate whether all transform coefficients of the first chroma component are zeros, a third syntax element associated with a second chroma component of the first transform unit to indicate whether all transform coefficients of the second chroma component are zeros, and a fourth syntax element associated with luma component of the first transform unit to indicate whether all transform coefficients of the luma component are zeros; decoding the transform coefficients of chroma and luma components of the first transform unit, based on the second, third and fourth syntax elements, from the bitstream; and setting transform coefficients of luma and chroma components of rest of the plurality of transform units to zeros.

According to a second aspect of the present application, an electronic apparatus includes one or more processing units, memory and a plurality of programs stored in the memory. The programs, when executed by the one or more processing units, cause the electronic apparatus to perform the operations described above.

According to a third aspect of the present application, a non-transitory computer readable storage medium stores a plurality of programs for execution by an electronic apparatus having one or more processing units. The programs, when executed by the one or more processing units, cause the electronic apparatus to perform the operations described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIG. 6 is a flowchart illustrating a process of decoding a sub-block transform coding unit in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
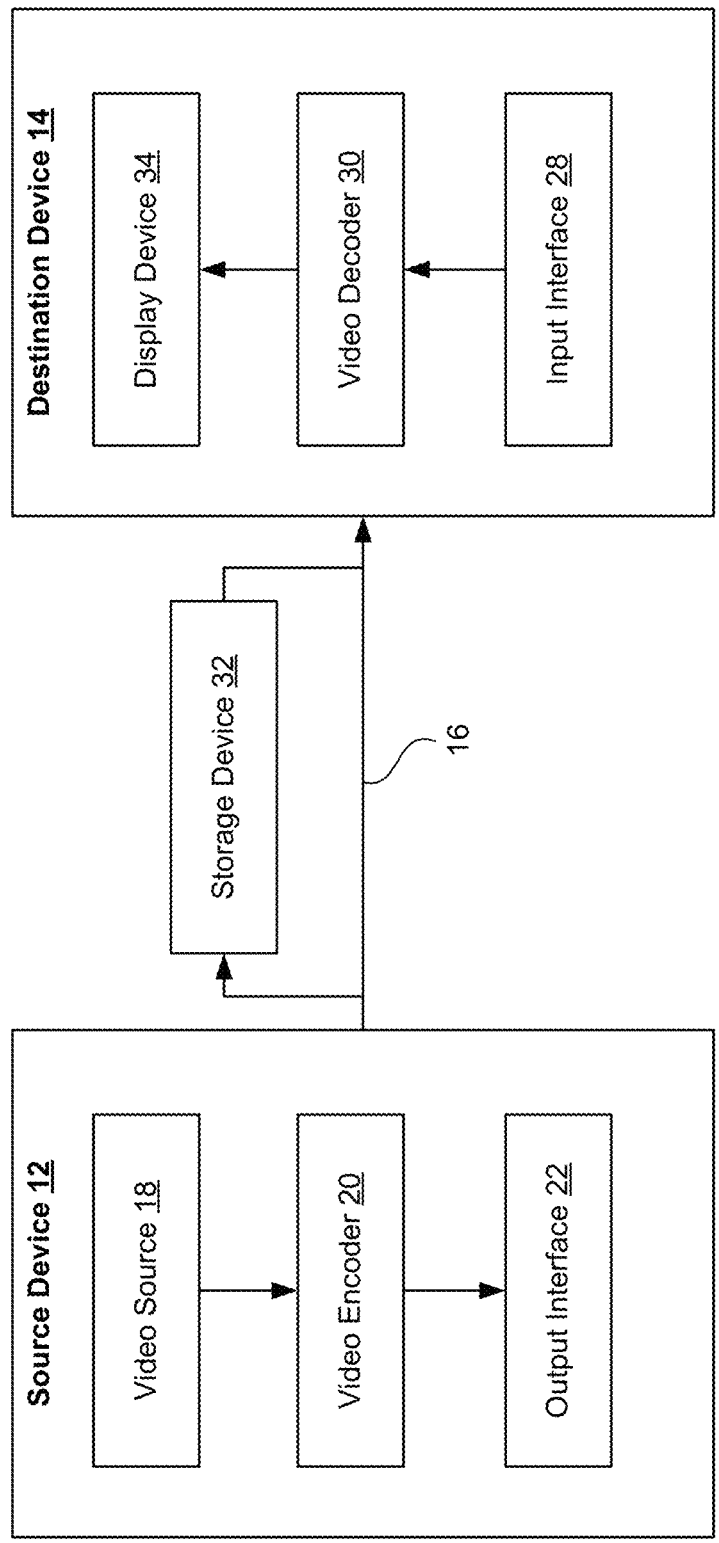
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable coder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
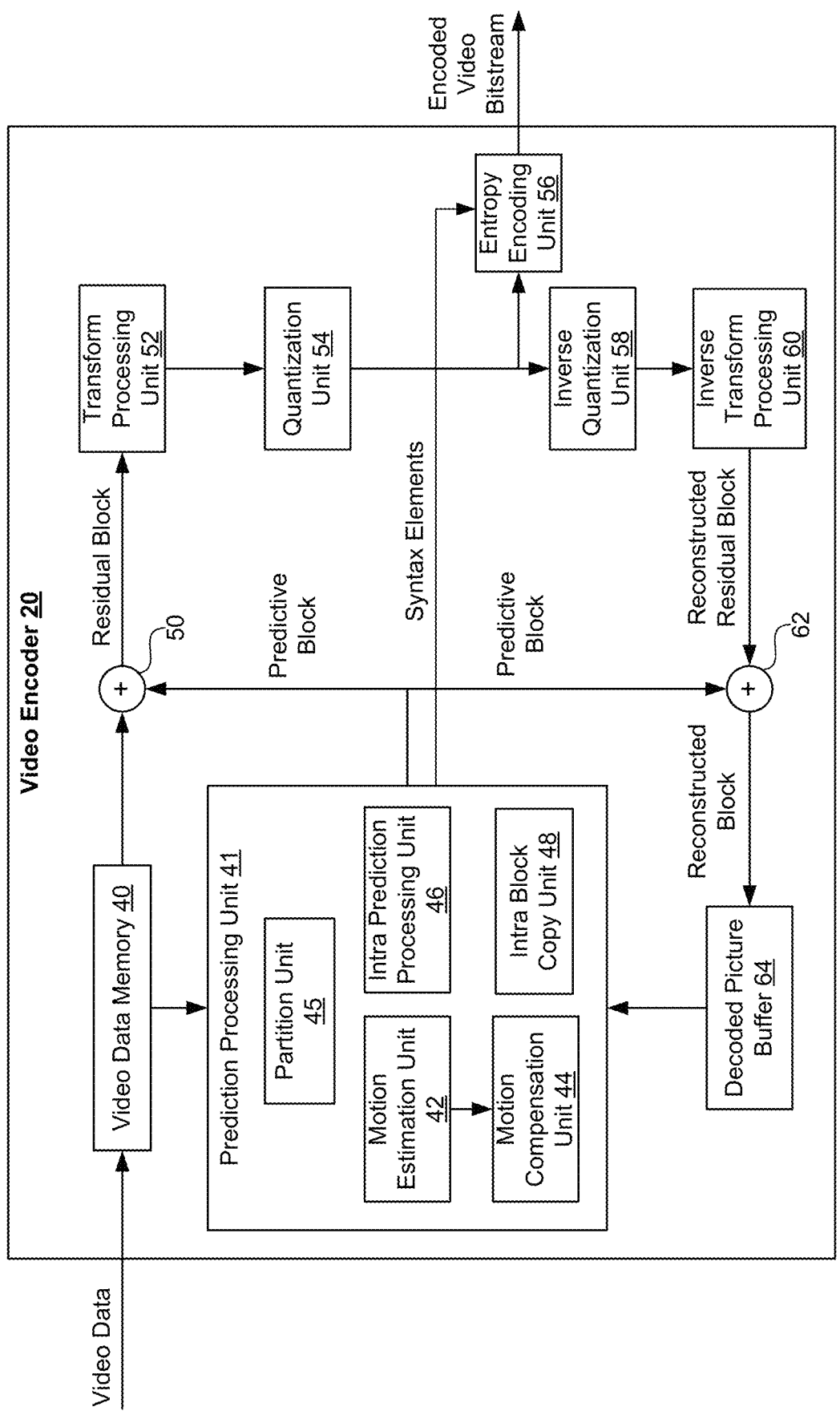
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
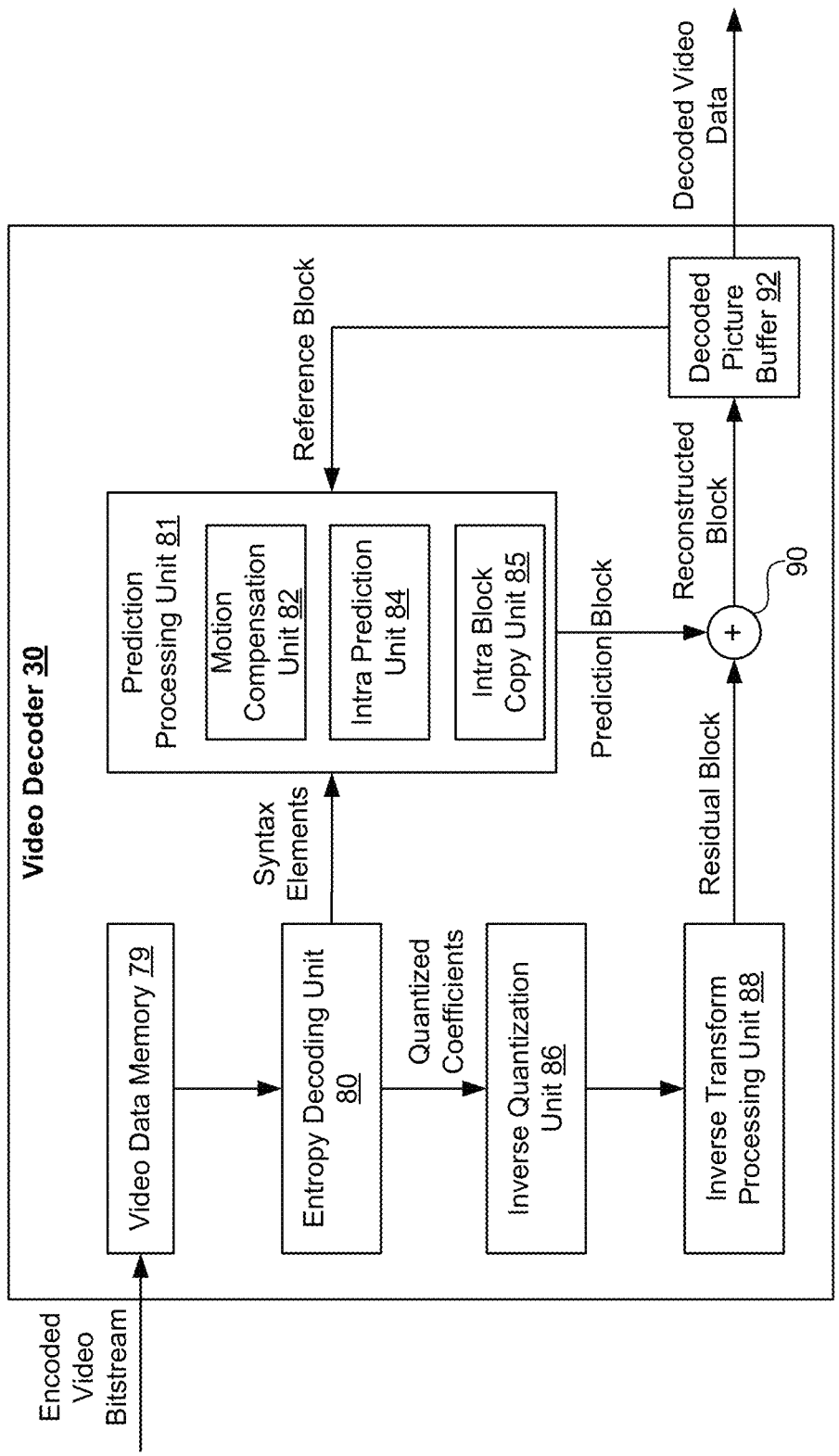
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
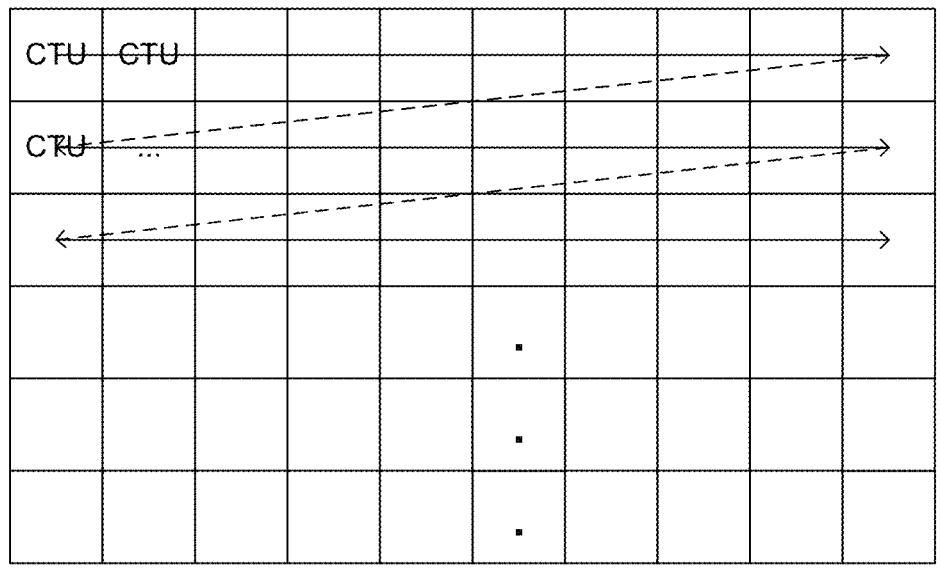
FIGS. 4A through 4F are block diagrams illustrating how a frame is recursively quad-tree partitioned into multiple video blocks of different sizes and shapes in accordance with some implementations of the present disclosure.
Figure 4B:
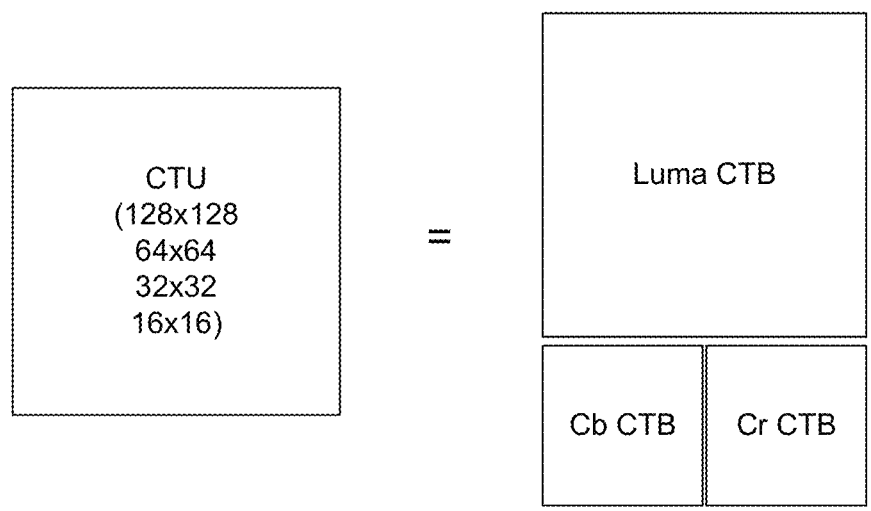

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
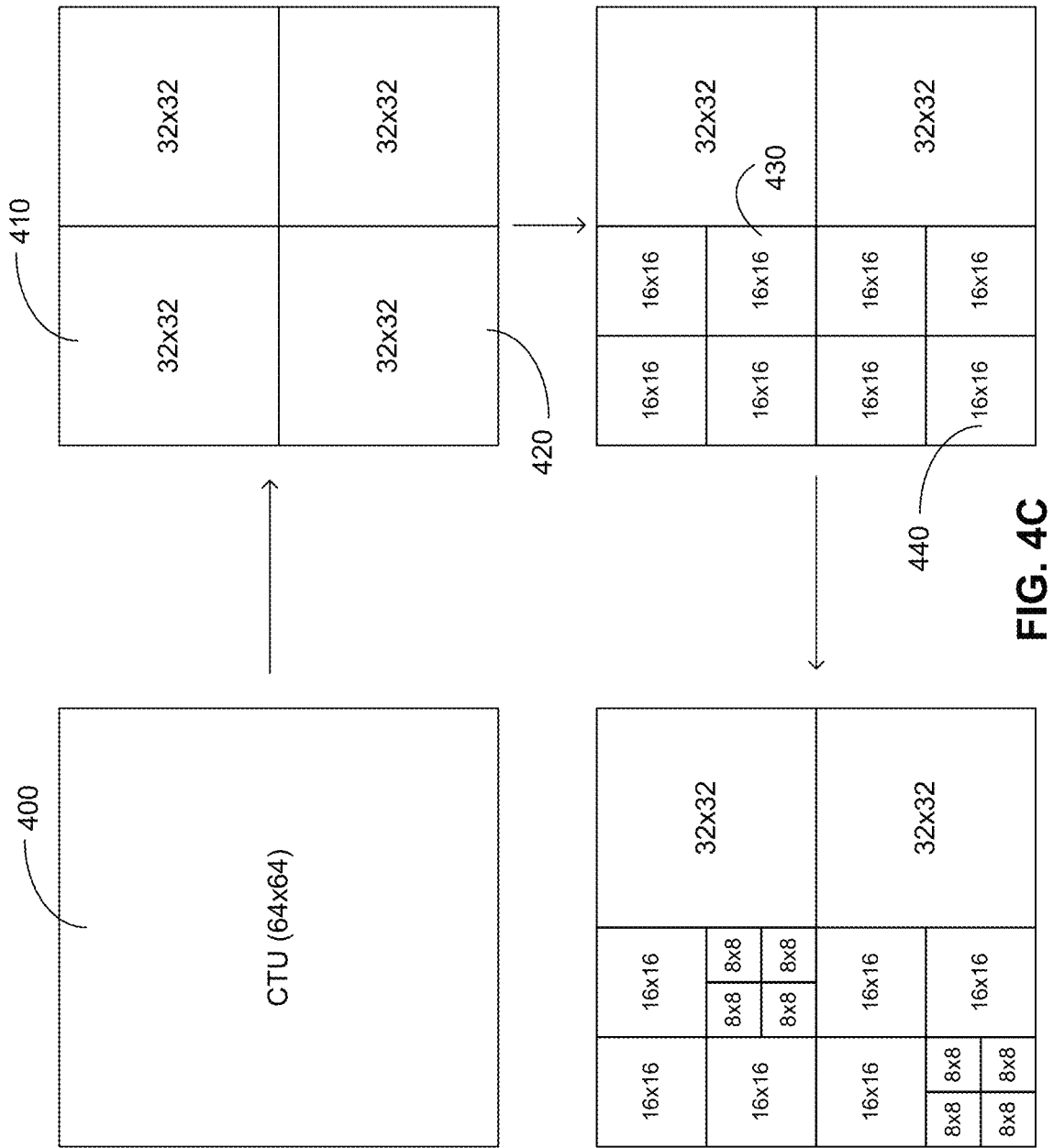
Figure 4D:
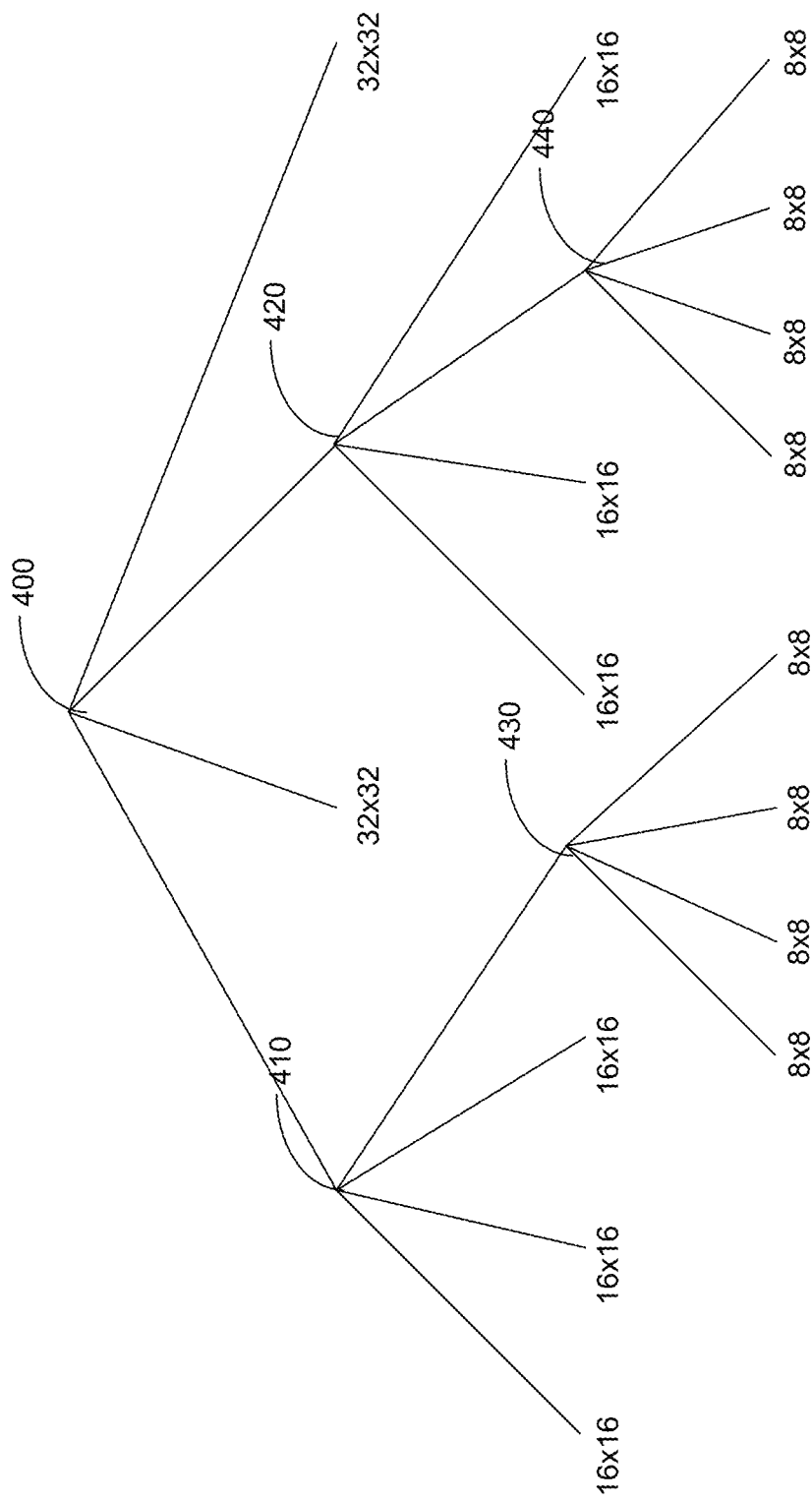
Figure 4E:
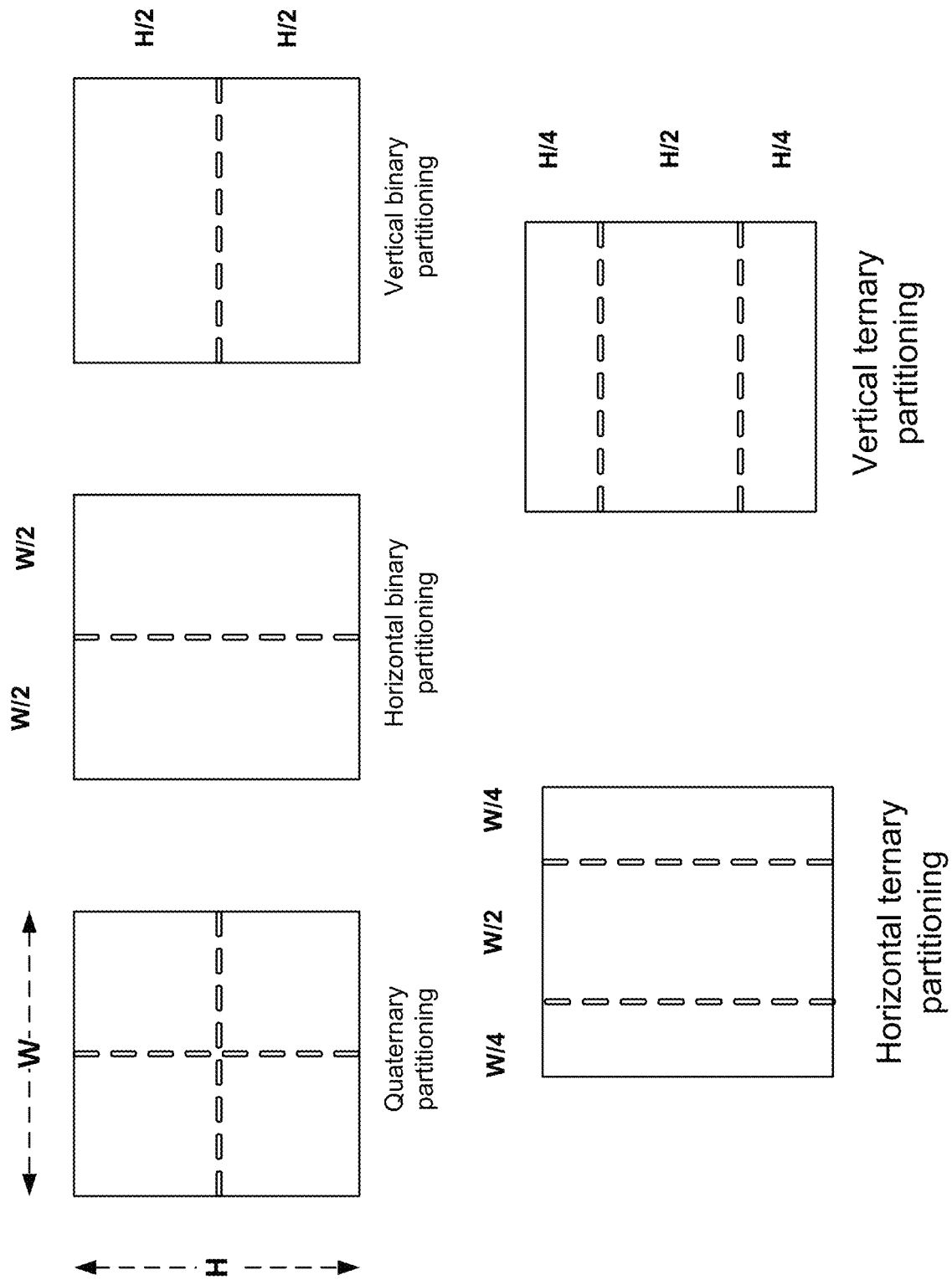

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a subblock of the CU's luma residual block. The Cb transform block may be a subblock of the CU's Cb residual block. The Cr transform block may be a subblock of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

With digital video quality going from high definition, to 4K×2K or even 8K×4K, the amount of vide data to be encoded/decoded grows exponentially. It is a constant problem in terms of how the video data can be encoded/decoded more efficiently while maintaining the image quality of the decoded video data. Different approaches have been adopted by the various video coding standards to solve this problem. For example, it has been found that the translation motion model behaves poorly for motion compensation prediction when there are many kinds of motion, e.g. zoom in/out, rotation, perspective motions and the other irregular motions in the real world. Accordingly, multiple block-based affine motion models have been proposed to increase the accuracy of motion compensation prediction.

Figure 4F:
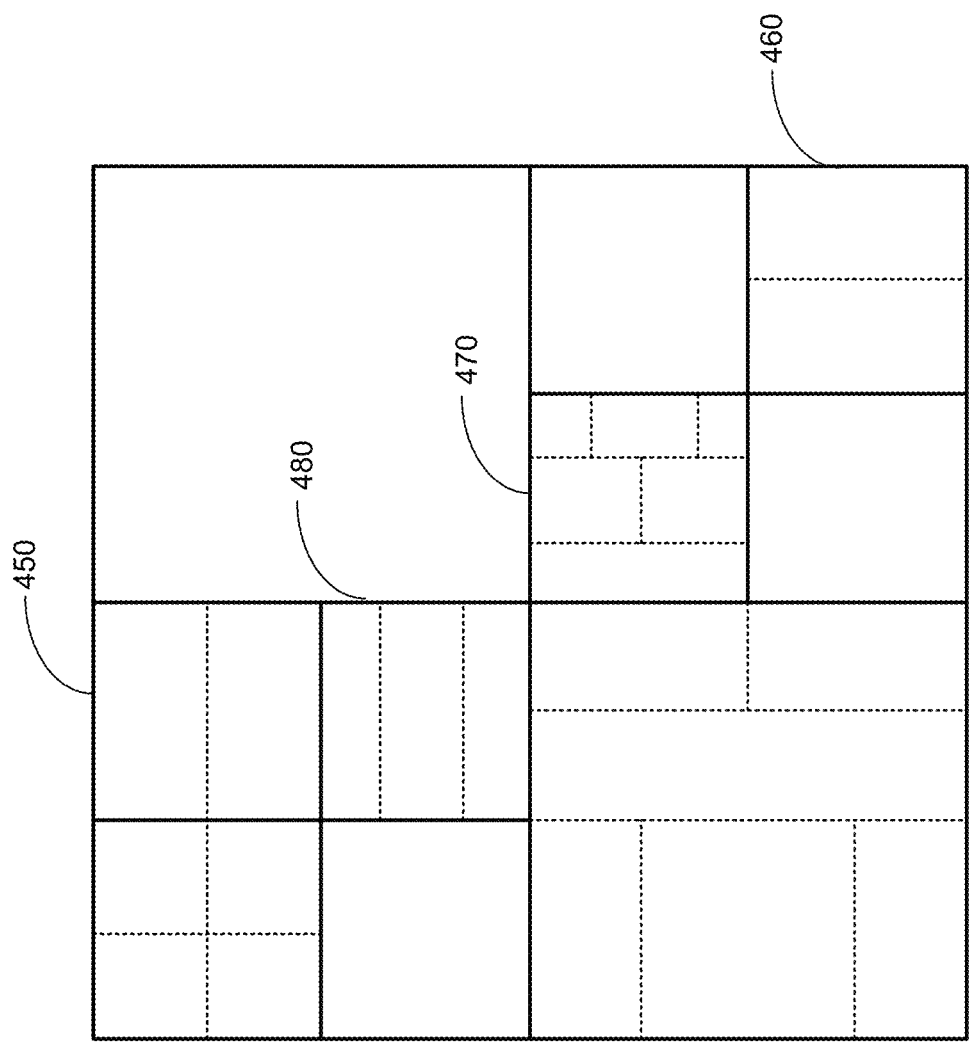

FIG. 4F shows an example of a multi-type tree partition structure that splits a leaf CU (e.g., the leaf CU 440 in FIG. 4C) into one or more PUs according to a specified PU splitting type. Each leaf CU can be further split into one, two or four PUs according to the specified PU splitting type. The same motion information (e.g., MVs and reference picture indices) is shared by all the samples of one PU, i.e., only one single motion compensation process is needed to generate the reference samples of the PU. After obtaining the residual signal of one CU by subtracting its prediction signal from the corresponding original signal, the CU can be split into multiple TUs according to another quadtree structure similar to that is applied to split the CUs.

In some embodiments (e.g., in VVC), a multi-type tree partition structure which is based on quadtree split, binary split and ternary split is applied to replace the concept of multiple partition types, i.e. it removes the separation of the CU, PU and TU concepts. In such partition structure, one CU can have either a square or rectangular shape. Specifically, one CTU is first partitioned based on quadtree structure (e.g., refer to FIGS. 4C and 4D and the related description), then each quadtree leaf node (e.g., leaf CU 440 of FIG. 4C) can be further partitioned by a multi-type tree partition structure. In some embodiments, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). For example, leaf CU 450 (32×32 in size) is partitioned according to horizontal binary splitting which results in two regions each having 16×32 in size. Leaf CU 460 (32×32 in size) is partitioned according to vertical binary splitting which results in two regions each having 32×16 in size. Leaf CU 470 is partitioned according to vertical ternary splitting and results in three regions having the size of 32×8, 32×16, and 32×8, respectively. Note that the middle region is further partitioned according to horizontal binary splitting, and the right region is further partitioned according to horizontal ternary splitting. Leaf CU 480 (32×32 in size) is partitioned according to horizontal ternary splitting and results in three regions having the size of 8×32, 16×32, and 8×32.

In some embodiments, each multi-type tree leaf node is treated as one CU and is used as the basic unit for both prediction and transformation processes without further partitioning, except for (1) when several subblock coding modes are used to apply transformation on subblock basis, and (2) when either the width or the height of one CU is larger than the maximum allowed transform size (e.g., 64 samples). In the latter case, the CU will be split in horizontal direction, vertical direction, or both, into multiple TUs to ensure that the applied transform not exceeding the maximum supported transform size. As can be seen above, in most cases, the CU, PU and TU share the same block size in the partition structure.

Figure 5A:
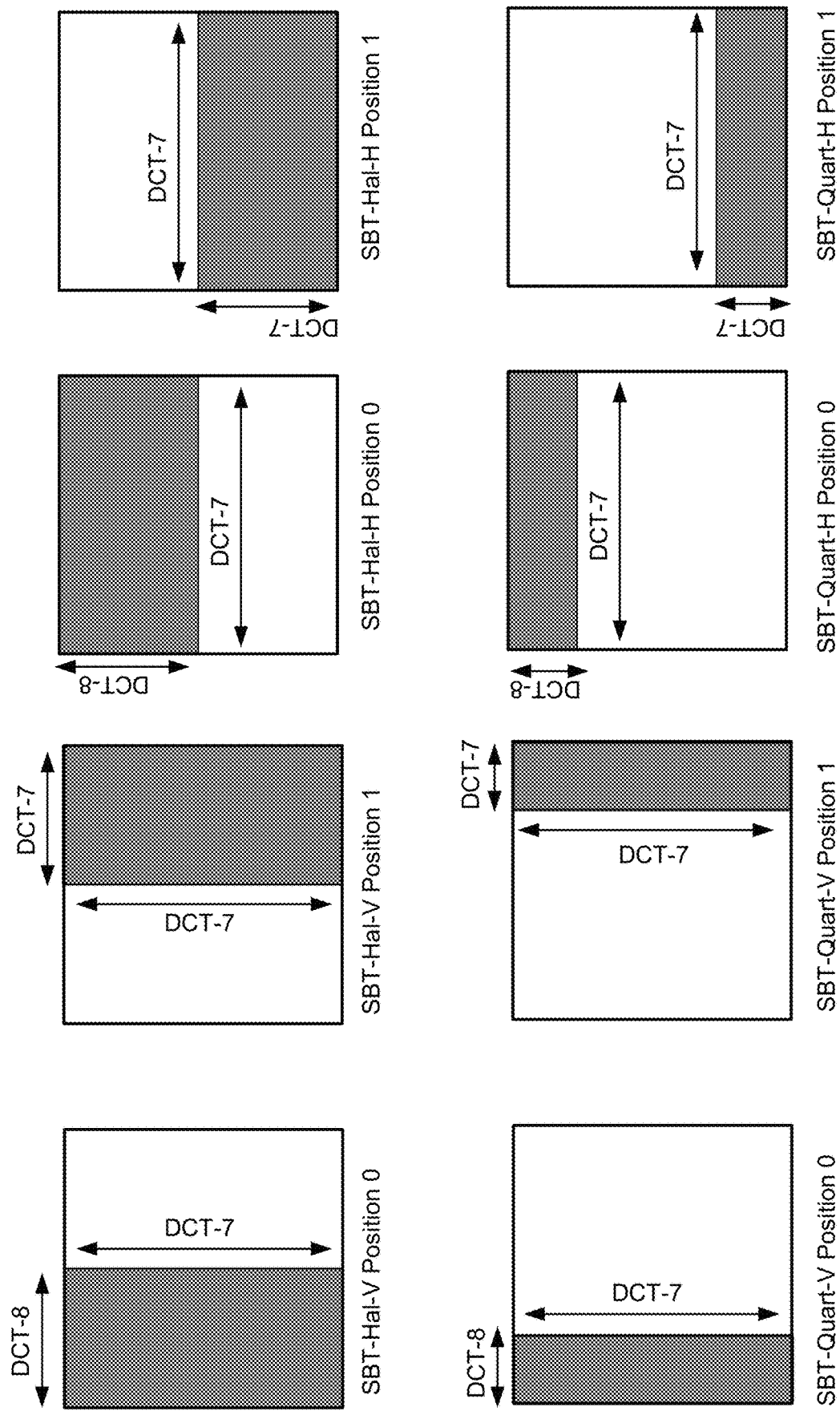
FIGS. 5A-5B are block diagrams illustrating different subblock transform partitions of a leaf coding block in accordance with some implementations of the present disclosure.
Figure 5B:
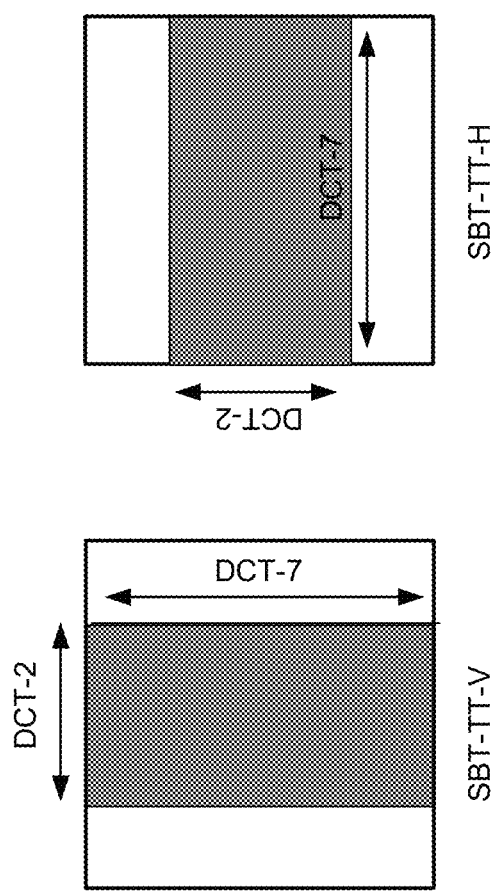

FIGS. 5A-5B illustrates different subblock transform (SBT) partitions in accordance with some implementations of the present disclosure. SBT mode is supported for inter-predicted CUs (also known as "inter CUs") to enhance the efficiency of transform coding. For each inter CU with at least one non-zero transform coefficient (e.g., indicated by a syntax element cu_root_cbf set to 1), a CU-level flag cu_sbt_flag is signaled to indicate whether the residuals of the entire CU or the residuals of only a part of the CU are coded. If the residuals of the entire CU are coded, the CU is treated by the encoder as a single TU, that is, the residuals of the entire CU are transformed based on a single transformation (e.g., with the size of the transform block equal to the size of the CU), quantized and coded into the bitstream. If only residuals of a part of the CU (e.g., half, a quarter, or a third of the CU) are coded, the residuals of the whole CU are implicitly partitioned into two groups: the first group of the residuals is coded with certain pre-assigned transformations (e.g., DCT-7 or DCT-8) and transmitted from the encoder to the decoder, while the second group of the residuals is set to zero-values without signaling.

In some embodiments, chroma residuals (Cr and Cb residuals) of a SBT CU are always coded using DCT-2, while luma residuals of the SBT CU are coded in a position-dependent transform method. Specifically, as shown in FIG. 5A, depending on different SBT partition patterns, two SBT positions are assigned with either DCT-8 or DST-7 transform. For example, the horizontal and vertical transforms for SBT-Hal-V and SBT-Quart-V position 0 are DCT-8 and DST-7, respectively. To avoid introducing new transform size, when one side of the residual TU is greater than 32, the corresponding transform is set as DCT-2. Therefore, the SBT mode jointly specifies the TU partitioning, whether each TU contains non-zero residuals, and horizontal and vertical transforms that are applied, which may be considered a syntax shortcut for the cases that the major residual of one CU is located on one side of the CU.

In conventional intra mode, the reconstructed samples neighboring to a CU are used to generate the intra prediction samples of the CU. Based on such method, the spatial correlation between the predicted samples and the reference samples is roughly proportional to the distance between the predicted samples and the reference samples. Therefore, the samples at the inner part (especially the samples located at the bottom-right corner of the block) usually have a worse prediction quality than the samples that are close to the top and/or left block boundaries. To improve the intra prediction efficiency, short-distance intra prediction (SDIP) was proposed and studied well during the development period of the HEVC standard. The method divides an intra coding block horizontally or vertically into multiple subblocks for prediction. One extreme case of such subblock based intra prediction is so-called line-based prediction, wherein a block is divided into 1-D row/column for prediction.

In some embodiments, an intra coding tool called intra sub-partition (ISP) mode, which is designed in the same flavor of the SDIP, is used to improve intra coding efficiency. The ISP divides luma samples of one intra CU vertically or horizontally into 2 or 4 sub-partitions depending on the CU size. For example, minimum CU size for ISP is 4×8 (or 8×4). If CU size is equal to 4×8 (or 8×4), then the CU is divided into 2 sub-partitions under ISP mode. If CU size is greater than 4×8 (or 8×4), then the CU is divided into 4 sub-partitions under ISP mode. According to the current ISP design, a sub-partition has to contain at least 16 samples. Additionally, in the existing ISP design, when the ISP mode is enabled for one CU, only the luma residuals of the CU are partitioned into multiple TUs for transform coding while the residuals of the two chroma components (i.e., Cb and Cr) are coded as a whole without further TU partitioning.

In the VVC standard, a syntax element named coded block flag (CBF) is used to signal the significance of the residuals for each CU, i.e., it signals whether the CU contains nonzero residuals. According to the current design in VVC, there are separate CBFs for the one luma and the two chroma components of a given CU. If the CBF of a respective component is equal to zero, then no transform coefficient is signaled for the component and all the transform coefficients are set to zero; otherwise, the transform coefficients are coded into the bitstream. Additionally, as mentioned earlier, there are three different scenarios in the VVC where one CU is split into multiple TUs and the residuals of each TU are coded separately. These three scenarios include the SBT TU partitioning, the ISP TU partitioning, and the TU partitioning caused by maximal transform size restriction when the CU width and/or height is larger than the maximum allowed transform size. According to the current VVC specification draft, in all these three scenarios, one same signaling method is applied to indicate if there are non-zero transform coefficients for the luma component, i.e. sending one tu_luma_cbf for each TU separately. However, different methods are applied to signaling the CBFs of chroma components in these three scenarios, as described below:

Maximum-transform-size based TU partitioning: Two additional CBF flags tu_cb_cbf and tu_cr_cbf are signaled for each TU to indicate if there are non-zero coefficients existing in the corresponding chroma component of a TU. If one chroma CBF flag is equal to 0, it indicates all the residuals of that chroma component are zero and no residual information needs to be transmitted. Otherwise (i.e., the CBF flag is equal to 1), the residuals of the corresponding chroma component are transmitted.

ISP TU partitioning: As mentioned earlier, in the ISP mode, the TU partitioning is only applied to code the luma residuals while the residuals of the chroma components are coded without TU partitioning. Therefore, two chroma CBF flags, i.e., tu_cb_cbf and tu_cr_cbf, are signaled for the whole CU to indicate whether one chroma component has non-zero transform coefficient. Note that because the ISP TU partitioning is not applied to chroma components, the CU level is equal to the TU level for the chroma CBF signaling of the ISP mode.

SBT TU partitioning (as shown in FIG. 5A): Different from the ISP mode, the TU partitioning of the SBT mode is applied to both luma and chroma components. Additionally, the residuals (both luma and chroma components) of one of the TU partitions are forced to be zero. Based on the existing SBT design, two CBFs are signaled at the CU level for the two chroma components, respectively. When the CBF of one chroma component is equal to 0, all the residuals of the chroma component are set to zero without signaling. Otherwise (i.e., the CBF is equal to 1), only the residuals of the non-zero SBT partition (e.g., the left partition of the SBT-Hal-V position0 and SBT-Quart-V position0 and the right partition of the SBT-Hal-V position1 and SBT-Quart-V positition1 in FIG. 5) are transmitted in bitstream. In the current VVC reference software (VTM), the chroma residuals of the other SBT partition are always set to be zeros by sending the corresponding CBF as zero.

Based on the above comparison, the following issues have been identified for the chroma CBF signaling of the SBT mode:

1. Different signaling methods are used to signal the chroma CBFs for TU partitioning schemes under different scenarios. Specifically, for both the maximum-transform-size based TU partitioning and the ISP TU partitioning, the chroma CBFs are signaled at TU level to indicate whether one TU contains non-zero residuals for one corresponding chroma component. However, for the SBT TU partitioning, the two chroma CBFs are signaled at the CU-level. Such non-unified design may not be optimal from the standardization point of view.
2. As pointed out earlier, in current VTM two chroma CBFs are always signaled for the zero SBT partitions (the right partition of the SBT-Hal-V position0 and SBT-Quart-V position0 and the left partition of the SBT-Hal-V position1 and SBT-Quart-V positition1 in FIG. 5A). However, those two flags are redundant given that all the chroma residuals of the zero SBT partitions are zeros by definition, i.e., the corresponding chroma CBFs are always equal to 0.
3. Different context models are used to code the chroma CBFs of those three TU partitioning modes. Specifically, for the maximum-transform-size based TU partitioning and the ISP TU partitioning, the context model used to code chroma CBFs, i.e., tu_cb_cbf and tu_cr_cbf, is determined by the TU depth (i.e., the corresponding TU partitioning level with the CU). This is different from the SBT mode where one fixed context model is used without considering the depth of the TU partitioning.

In some embodiments, the chroma CBF signaling methods of different TU partitioning schemes are unified by moving the chroma CBF signaling from CU level to TU level for the SBT mode. Table 1 illustrates one example pseudo code of the corresponding transform unit syntax table when a proposed method is applied, where the SBT related syntax are bolded. Refer to FIG. 6 and the related description on detail of the harmonization of chroma CBF signaling for different TU partitioning schemes.

TABLE 1

The modified coding unit syntax table after Solution One is applied

| | Descriptor |
|---|---|
| transform_unit( x0, y0, tbWidth, tbHeight, treeType, subTuIndex ) { | |
|   if( ( treeType = = SINGLE_TREE \|\| treeType = = DUAL_TREE_CHROMA ) { | |
|     if( ( IntraSubPartitionsSplitType = = ISP_NO_SPLIT && !(cu_sbt_flag && | |
|       ( ( subTuIndex = = 0 && cu_sbt_pos_flag ) \|\| | |
|         ( subTuIndex = = 1 && !cu_sbt_pos_flag ) ) ) ) \| ( | |
| IntraSubPartitionsSplitType != ISP_NO_SPLIT && | |
|       ( subTuIndex = = NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|     } | |
|   } | |
|   if( treeType = = SINGLE_TREE \|\| treeType = = DUAL_TREE_LUMA ) { | |
|     if( ( IntraSubPartitionsSplitType = = ISP_NO_SPLIT && !(cu_sbt_flag && | |
|       ( ( subTuIndex = = 0 && cu_sbt_pos_flag ) \|\| | |
|         ( subTuIndex = = 1 && !cu_sbt_pos_flag ) ) ) && | |
|       ( CuPredMode[ x0 ][ y0 ] == MODE_INTRA \|\| | |
|         tu_cbf_cb[ x0 ][ y0 ] \|\| tu_cbf_cr[ x0 ][ y0 ] ) ) \|\| | |
|     ( IntraSubPartitionsSplitType != ISP_NO_SPLIT && | |
|       ( subTuIndex < NumIntraSubPartitions − 1 \|\| !InferTuCbfLuma ) ) ) | |
|     tu_cbf_luma[ x0 ][ y0 ] | ae(v) |
|     if (IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   ...... | |
| } | |

As shown in Table 1, by the proposed method, both the luma CBF tu_cbf_luma and two chroma CBFs tu_cbf_cb and tu_cbf_cr are signaled for each SBT TU separately. Additionally, the presence of the luma CBF and chroma CBFs of one SBT TU is conditioned on the position information of the SBT partition. More specifically, the signaling of both luma and chroma CBFs is omitted for the corresponding zero SBT partition (the right partition of the SBT-Hal-V position0 and SBT-Quart-V position0 and the left partition of the SBT-Hal-V position1 and SBT-Quart-V positition1 in FIG. 5) that only contains zero residuals. On the other hand, based on the existing SBT design in VVC, the SBT mode can only be enabled for an inter CUs whose root CBF (i.e., cu_root_cbf) is equal to 1. In other words, the SBT mode can only be enabled when there is at least one non-zero transform coefficient (either luma or chroma) for the whole CU. In addition, as shown in Table 1, for one non-zero SBT TU partition the chroma CBFs are signaled in front of the luma CBF, and the luma CBF is signaled only if at least one of the two chroma CBFs is 1.

In some embodiments, ternary tree (TT) split for the subblock partitioning of the SBT mode is enabled, as illustrated by FIG. 5B. Specifically, in addition to the current binary tree (BT) and adaptive binary tree (ABT) split patterns, two additional SBT partition types, namely SBT-TT-V and SBT-TT-H, are introduced. In the SBT-TT-V/SBT-TT-H mode, the current CU is vertically/horizontally split into three TUs with 1:2:1 partition ratio and only the middle TU partition contains non-zero residuals while the residuals of the two boundary TU partitions are always set to be zeros without signaling.

In some embodiments, when TT split is used for subblock partitioning under SBT mode, in order to better compact the local residual energy in frequency domain, position-dependent transform selection method is applied to adaptively select core transform for different dimensions of the non-zero TT partition. One example is illustrated in FIG. 5B, where the horizontal and vertical transforms of the middle TU of the SBT-TT-V are DCT-2 and DST-7, respectively. In another example, in order to avoid introducing different DST-7 transform sizes, the DST-7 transform is only enabled when the non-split CU side (i.e., the side without TU split) is no larger than 32 samples; otherwise, the corresponding transform along that direction of the TU will be replaced with DCT-2. In a third example, other core transforms (in addition to DCT-2 and DST-7) are applied in the proposed TT-based SBT partition scheme to accommodate varying characteristics of the residuals in different blocks.

In some embodiments, when the proposed TT partition patterns are used, other different SBT partition patterns may be enabled wholly and/or partially under the SBT mode. In one example, it is proposed to use the TT partition patterns to replace the ABT partition patterns to split the TUs of the SBT mode. Specifically, by this method, there are in total 6 SBT partitions, i.e., SBT-BT-H Position0, SBT-BT-H Position1, SBT-BT-V Position0, SBT-BT-V Position1, SBT-TT-H and SBT-TT-V. In another example, it is proposed to enable all the BT partition patterns, the ABT partition patterns and the TT partition patterns for the SBT mode, i.e., SBT-BT-H Position0, SBT-BT-H Position1, SBT-BT-V Position0, SBT-BT-V Position1, SBT-Quart-H Position0, SBT-Quart-H Position1, SBT-Quart-V Position0, SBT-Quart-V Position1, SBT-TT-H and SBT-TT-V are all included.

FIG. 6 is a flowchart illustrating a process of a flowchart illustrating a process 600 of decoding a sub-block transform (SBT) coding unit in accordance with some implementations of the present disclosure. For convenience, process 600 is described as being performed by a decoder, such as video decoder 30 of FIG. 3.

As described above with respect to FIGS. 5A-5B, the SBT coding unit is partitioned into a plurality of transform units (e.g., SBT-Hal-V Position 0, SBT-Hal-V Position 1, etc.). Of the plurality of transform units, only one includes non-zero coefficients. For example, in the SBT-Hal-V Position 0 partitioning scheme, only the left transform unit includes non-zero coefficients and the right transform unit includes all-zero coefficients.

As the first step of decoding the SBT transform unit, the decoder receives, from a bitstream, a first syntax element (e.g., cu_root_cbf flag as described in table 1) associated with the SBT coding unit, wherein the first syntax element indicates that there exists at least one non-zero transform coefficient in the SBT coding unit (e.g., the first syntax element being "1") (610).

Next, in response to determining that the first syntax element indicates that there exists at least one non-zero transform coefficient in the SBT coding unit (e.g., the first syntax element being 1), the decoder determines a first transform unit of the plurality of transform units that includes non-zero transform coefficients. In some embodiments, the first transform unit is the only one of the plurality of transform units that includes non-zero transform coefficients. For example, in the SBT-Hal-V Position 0 partitioning scheme described in FIG. 5A, the left transform unit is the one that may include non-zero transform coefficient. In another example, in the SBT-TT-V partition scheme described in FIG. 5B, the middle transform unit is the one that may include non-zero transform coefficient. In some embodiments, determining the transform unit that includes non-zero coefficient is dependent on the positional information of the particular partitioning scheme, such as indicated by the syntax element "cu_sbt_pos_flag" in table 1 (620).

The decoder then receives, from the bitstream, a second syntax element (e.g., tu_cbf_cb in table 1) associated with a first chroma component (e.g., cb) of the first transform unit to indicate whether all transform coefficients of the first chroma component are zeros, and a third syntax element (e.g., tu_cbf_cr in table 1) associated with a second chroma component (e.g., cr) of the first transform unit to indicate whether all transform coefficients of the second chroma component are zeros (630).

The decoder then receives, from the bitstream, a fourth syntax element (e.g., tu_cbf_luma in table 1) associated with luma component of the first transform unit to indicate whether all transform coefficients of the luma component are zeros (640).

Based on the second, third, and fourth syntax elements, the decoder infers whether the chroma and luma components of the first transform unit include all-zero transform coefficients, and decodes the transform coefficients of the chroma and luma components (650).

Finally, since the other transform units (e.g., the right transform unit of SBT-Hal-V Position 0) include only zero coefficients, the decoder sets the luma and chroma components of the other transform units in the SBT coding unit to zero (660).

In some embodiments, the decoder receives the fourth syntax element from the bitstream only when at least one of the second and the third syntax element indicate that the respective chroma component includes non-zero coefficient (e.g., the second and/or the third syntax element equal to 1). On the other hand, when the second and the third syntax elements indicate that the chroma components only include zero coefficients (e.g., the second and the third syntax element equal to 0), the decoder sets the fourth syntax element to one.

In some embodiments, the SBT coding unit is partitioned into a ternary tree partition scheme (e.g., as shown in FIG. 5B) that divides a coding unit into three transform units, and wherein the transform coefficients of two of the three transform units are set to zeros.

In some embodiments, the three transform units are vertically adjacent to each other and include a top transform unit, a center transform unit, and a bottom transform unit, and wherein the top transform unit and the bottom transform unit have all-zero coefficients.

In some embodiments, DST-VII transform is applied in the horizontal direction, and DCT-II transform is applied in the vertical direction of the center transform unit.

In some embodiments, the three transform units are horizontally adjacent to each other and include a leftmost transform unit, a center transform unit, and a right rightmost transform unit, and the leftmost transform unit and the rightmost transform unit have all-zero transform coefficients.

In some embodiments, DST-VII transform is applied in the vertical direction, and DCT-II transform is applied in horizontal direction of the center transform unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of video decoding, comprising:
   receiving, from a bitstream, a first syntax element associated with a coding unit, wherein the first syntax element indicates whether there exists at least one non-zero transform coefficient in the coding unit;
   in response to receiving the first syntax element indicating that there exists at least one non-zero transform coefficient in the coding unit, receiving a second syntax element indicating whether the coding unit is coded with a sub-block transform (SBT) mode;
   in response to receiving the second syntax element indicating that the coding unit is coded with the SBT mode, for a first transform unit of a plurality of transform units partitioned from the coding unit, receiving, from the bitstream, a third syntax element associated with a first chroma component of the first transform unit to indicate whether all transform coefficients of the first chroma component are zeros, receiving a fourth syntax element associated with a second chroma component of the first transform unit to indicate whether all transform coefficients of the second chroma component are zeros, and receiving a fifth syntax element associated with luma component of the first transform unit to indicate whether all transform coefficients of the luma component are zeros only when at least one of the third and fourth syntax elements is equal to one, wherein the first transform unit includes non-zero transform coefficients;
   decoding the transform coefficients of chroma and luma components of the first transform unit, based on the third, fourth and fifth syntax elements; and
   setting transform coefficients of luma and chroma components of rest of the plurality of transform units to zeros,
   wherein the third syntax element is equal to 1 and the fourth syntax element is equal to 0 or 1, or the third syntax element is equal to 0 and the fourth syntax element is equal to 1.

2. The method of claim 1, wherein the first transform unit is the only one of the plurality of transform units that includes non-zero transform coefficients.

3. The method of claim 1, further comprising:
   setting the fifth syntax element to one when both the third and fourth syntax elements are zeros.

4. The method of claim 1, wherein the coding unit is partitioned into a ternary tree partition scheme that divides a coding unit into three transform units, and wherein the transform coefficients of two of the three transform units are set to zeros.

5. The method of claim 4, wherein the three transform units are vertically adjacent to each other and include a top transform unit, a center transform unit, and a bottom transform unit, and wherein the top transform unit and the bottom transform unit have all-zero coefficients.

6. The method of claim 5, wherein DST-VII transform is applied in a horizontal direction, and DCT-II transform is applied in a vertical direction of the center transform unit.

7. The method of claim 4, wherein the three transform units are horizontally adjacent to each other and include a leftmost transform unit, a center transform unit, and a right rightmost transform unit, and the leftmost transform unit and the rightmost transform unit have all-zero transform coefficients.

8. The method of claim 7, wherein DST-VII transform is applied in a vertical direction, and DCT-II transform is applied in a horizontal direction of the center transform unit.

9. A computing device comprising:
one or more processors;
memory coupled to the one or more processors; and
a plurality of programs stored in the memory that, when executed by the one or more processors, cause the computing device to perform acts comprising:
receiving, from a bitstream, a first syntax element associated with a coding unit, wherein the first syntax element indicates whether there exists at least one non-zero transform coefficient in the coding unit;
in response to receiving the first syntax element indicating that there exists at least one non-zero transform coefficient in the coding unit, receiving a second syntax element indicating whether the coding unit is coded with a sub-block transform (SBT) mode;
in response to receiving the second syntax element indicating that the coding unit is coded with the SBT mode, for a first transform unit of a plurality of transform units partitioned from the coding unit,
receiving, from the bitstream, a third syntax element associated with a first chroma component of the first transform unit to indicate whether all transform coefficients of the first chroma component are zeros, receiving a fourth syntax element associated with a second chroma component of the first transform unit to indicate whether all transform coefficients of the second chroma component are zeros, and receiving a fifth syntax element associated with luma component of the first transform unit to indicate whether all transform coefficients of the luma component are zeros only when at least one of the third and fourth syntax elements is equal to one, wherein the first transform unit includes non-zero transform coefficients;
decoding the transform coefficients of chroma and luma components of the first transform unit, based on the third, fourth and fifth syntax elements; and
setting transform coefficients of luma and chroma components of rest of the plurality of transform units to zeros,
wherein the third syntax element is equal to 1 and the fourth syntax element is equal to 0 or 1, or the third syntax element is equal to 0 and the fourth syntax element is equal to 1.

10. The computing device of claim 9, wherein the first transform unit is the only one of the plurality of transform units that includes non-zero transform coefficients.

11. The computing device of claim 9, wherein the acts further comprise:
setting the fifth syntax element to one when both the third and fourth syntax elements are zeros.

12. The computing device of claim 9, wherein the coding unit is partitioned into a ternary tree partition scheme that divides a coding unit into three transform units, and wherein the transform coefficients of two of the three transform units are set to zeros.

13. The computing device of claim 12, wherein the three transform units are vertically adjacent to each other and include a top transform unit, a center transform unit, and a bottom transform unit, and wherein the top transform unit and the bottom transform unit have all-zero coefficients.

14. The computing device of claim 13, wherein DST-VII transform is applied in a horizontal direction, and DCT-11 transform is applied in a vertical direction of the center transform unit.

15. The computing device of claim 12, wherein the three transform units are horizontally adjacent to each other and include a leftmost transform unit, a center transform unit, and a right rightmost transform unit, and the leftmost transform unit and the rightmost transform unit have all-zero transform coefficients.

16. The computing device of claim 15, wherein DST-VII transform is applied in a vertical direction, and DCT-11 transform is applied in a horizontal direction of the center transform unit.

17. A method for storing a bitstream, comprising:
performing an encoding method to generate a bitstream; and
storing the bitstream on a non-transitory computer readable storage medium,
wherein the encoding method comprises:
determining a first syntax element associated with a coding unit, wherein the first syntax element indicates whether there exists at least one non-zero transform coefficient in the coding unit;
in response to the first syntax element indicating that there exists at least one non-zero transform coefficient in the coding unit, determining a second syntax element indicating whether the coding unit is coded with a sub-block transform (SBT) mode;
in response to the second syntax element indicating that the coding unit is coded with the SBT mode,
for a first transform unit of a plurality of transform units partitioned from the coding unit,
determining a third syntax element associated with a first chroma component of the first transform unit to indicate whether all transform coefficients of the first chroma component are zeros, determining a fourth syntax element associated with a second chroma component of the first transform unit to indicate whether all transform coefficients of the second chroma component are zeros, and determining a fifth syntax element associated with luma component of the first transform unit to indicate whether all transform coefficients of the luma component are zeros only when at least one of the third and fourth syntax elements is equal to one, wherein the first transform unit includes non-zero transform coefficients;
decoding the transform coefficients of chroma and luma components of the first transform unit, based on the third, fourth and fifth syntax elements; and
setting transform coefficients of luma and chroma components of rest of the plurality of transform units to zeros,
wherein the third syntax element is equal to 1 and the fourth syntax element is equal to 0 or 1, or the third syntax element is equal to 0 and the fourth syntax element is equal to 1.

18. The method of claim 17, wherein the first transform unit is the only one of the plurality of transform units that includes non-zero transform coefficients.

* * * * *